United States Patent
Byun

(10) Patent No.: US 9,569,113 B2
(45) Date of Patent: Feb. 14, 2017

(54) DATA STORAGE DEVICE AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 149 days.

(21) Appl. No.: 14/048,890

(22) Filed: Oct. 8, 2013

(65) Prior Publication Data

US 2014/0108721 A1    Apr. 17, 2014

(30) Foreign Application Priority Data

Oct. 11, 2012  (KR) .................. 10-2012-0113213
Oct. 11, 2012  (KR) .................. 10-2012-0113216

(51) Int. Cl.
*G06F 12/06*    (2006.01)
*G06F 3/06*     (2006.01)

(52) U.S. Cl.
CPC ............ *G06F 3/0608* (2013.01); *G06F 3/064* (2013.01); *G06F 3/0655* (2013.01); *G06F 3/0674* (2013.01); *G06F 3/0679* (2013.01); *G06F 3/0632* (2013.01)

(58) Field of Classification Search
CPC .... G06F 3/0674; G06F 3/0679; G06F 3/0608; G06F 3/064; G06F 3/0655; G06F 3/0632
USPC ..................... 711/112, 111, E12.001
See application file for complete search history.

(56) References Cited

U.S. PATENT DOCUMENTS

| | | | |
|---|---|---|---|
| 5,619,690 A * | 4/1997 | Matsumani et al. .......... 711/112 |
| 6,029,168 A * | 2/2000 | Frey .................. G06F 17/30067 |
| | | | 707/E17.01 |
| 7,188,229 B2 * | 3/2007 | Lowe .................. G06F 12/1027 |
| | | | 711/118 |
| 7,320,012 B2 * | 1/2008 | Kageyama ......... G11B 20/1833 |
| | | | 714/100 |
| 7,509,331 B2 * | 3/2009 | Nemoto .............. G06F 11/0709 |
| 7,925,846 B2 * | 4/2011 | Ebata .................... G06F 3/0608 |
| | | | 711/154 |
| 8,954,664 B1 * | 2/2015 | Pruett ................. G06F 11/1435 |
| | | | 711/112 |
| 2004/0002934 A1 * | 1/2004 | Taulbee ............ G06F 17/30067 |
| | | | 707/E17.01 |
| 2004/0111557 A1 * | 6/2004 | Nakatani et al. ............. 711/113 |
| 2005/0080984 A1 * | 4/2005 | Ueda .................. G11B 20/1217 |
| | | | 711/100 |
| 2006/0161731 A1 * | 7/2006 | Nakatani et al. ............. 711/112 |
| 2007/0033362 A1 * | 2/2007 | Sinclair ................. G06F 3/0607 |
| | | | 711/165 |
| 2008/0126667 A1 * | 5/2008 | Hatabe .................... G06F 3/061 |
| | | | 711/4 |

(Continued)

FOREIGN PATENT DOCUMENTS

KR   1020050027233   3/2005
KR   1020120045422   5/2012

*Primary Examiner* — Pierre-Michel Bataille
(74) *Attorney, Agent, or Firm* — IP & T Group LLP

(57) ABSTRACT

A data storage device include a storage memory, an information memory suitable for storing disk information and/or file information transmitted from a host device, and a controller suitable for processing a request on the data memory, which is received from the host device, based on the disk information and/or the file information stored in the information memory.

15 Claims, 17 Drawing Sheets

(56) References Cited

U.S. PATENT DOCUMENTS

| | | | |
|---|---|---|---|
| 2010/0217926 A1* | 8/2010 | Sinclair | G06F 3/0607 |
| | | | 711/103 |
| 2010/0223423 A1* | 9/2010 | Sinclair | G06F 3/0608 |
| | | | 711/103 |
| 2011/0099326 A1 | 4/2011 | Jung et al. | |
| 2012/0158804 A1* | 6/2012 | Lim | 707/823 |
| 2012/0233434 A1* | 9/2012 | Starks et al. | 711/170 |
| 2012/0284587 A1* | 11/2012 | Yu | G06F 3/0608 |
| | | | 711/103 |

* cited by examiner

FIG. 2

| CMD | DI No. | DI / LBA(S) | DI / LBA(E) | DI / J LBA(S) | DI / J LBA(E) |

FIG. 3

| DI | LBA |
|---|---|
| I | 0 ~ 100 |
| J | 101 ~ 2000 |

| CMD | ADDRESS | LENGTH | UID |

FIG. 9

| File System ID | File ID | UID |
|---|---|---|
| A | 1233 | A1233 |
| A | 1432 | A1432 |
| ...... | ...... | ...... |
| B | 1233 | B1233 |
| ...... | ...... | ...... |

FIG. 11

DATA STORAGE DEVICE AND OPERATING METHOD THEREOF

CROSS-REFERENCE TO RELATED APPLICATIONS

The present application claims priority of Korean Patent Application Nos. 10-2012-0113213 and 10-2012-0113216, filed on Oct. 11, 2012, which are incorporated herein by reference in their entirety.

BACKGROUND

1. Technical Field

Exemplary embodiments of the present invention relate to a data storage device, and more particularly, to a data storage device processing a request from a host device, and an operating method thereof.

2. Related Art

A flash memory is a kind of non-volatile memories and is controlled by a Flash Translation Layer (FTL) to process a request from a host device.

In general, disk information and file information may not be provided to a flash memory. Therefore, the flash memory may store a plurality of data that do not have any common characteristics in partition and/or file system in the same block.

When such irrelevant data are stored in a block included in the flash memory, the number of the blocks each including both valid pages and invalid pages may increase, and thus the available storage space may decrease. Therefore, the flash memory need to perform more garbage collection operations, and the cost for the garbage collection operations may increase due to the relatively low ratio of the invalid pages in the victim block.

Even though a TRIM command is provided by a host device to the flash memory, the TRIM function itself may not resolve the above concerns caused by the data dispersion.

SUMMARY

Various embodiments of the present invention are directed to a data storage device that may process a request from a host device by using disk information and/or file information from a host device, and an operating method thereof In an embodiment, a data storage device may include a storage memory, an information memory suitable for storing disk information and/or file information transmitted from a host device, and a controller suitable for processing a request on the data memory, which is received from the host device, based on the disk information and/or the file information stored in the information memory.

In an embodiment, a system may include a data storage device, and a host device providing disk information and/or file information to the data storage device. The data storage device may include a storage memory, an information memory suitable for storing the disk information and/or the file information transmitted from the host device, and a controller suitable for processing a request on the data memory, received from the host device based on the disk information and/or the file information in the information memory.

In an embodiment, an operating method of a system with a host device and a data storage device may include receiving, by the data storage device, a request and information on disk and/or file corresponding to the request from the host device, identifying, by the data storage device, a first physical address corresponding to the information on disk and/or file, and processing, by the data storage device, the request on the first physical address if the first physical address is identified. The operating method of the system may further include updating, by host device, the disk information and/or the file information, and transmitting, by host device, the updated disk information and/or the updated file information to the data storage device.

BRIEF DESCRIPTION OF THE DRAWINGS

FIG. 2 is a diagram illustrating a message format including disk information provided by a host device to a data storage device in accordance with an embodiment of the present invention, FIG. 3 illustrates an example of disk information managed by a host device in accordance with an embodiment of the present invention.

FIGS. 9 and 10 are diagrams illustrating a message format including file information provided by a host device to a data storage device in accordance with an embodiment of the present invention.

FIG. 11 illustrates an example of file identification number managed by a host device in accordance with an embodiment of the present invention.

DETAILED DESCRIPTION

Figure 1:
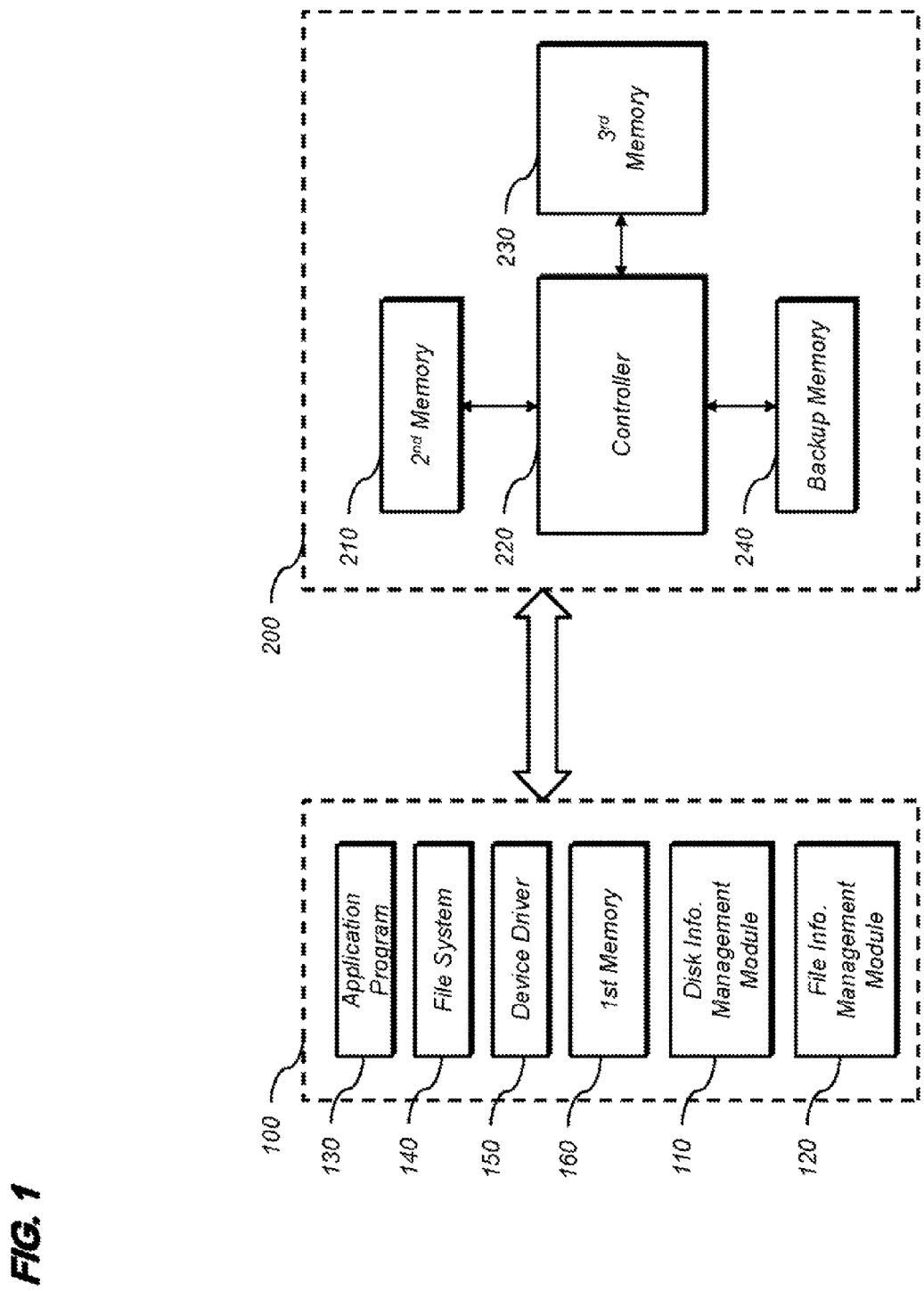
FIG. 1 is a block diagram illustrating a system with a data storage device and a host device in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. It is also noted that in this specification, "connected/coupled" refers to one component not only directly coupling another component but also indirectly coupling another component through an intermediate component. In addition, a singular form may include a plural form as long as it is not specifically mentioned in a sentence. Throughout the disclosure, reference numerals correspond directly to the like numbered parts in the various figures and embodiments of the present invention.

FIG. 1 is a block diagram illustrating a system with a data storage device 200 and a host device 100 in accordance with an embodiment of the present invention.

In the embodiment, the host device 100 may include an application program 130, a file system 140, a device driver 150 and a first memory 160.

The application program 130 may request read or write operations to the file system 140. The file system 140 may manage data stored in the data storage device 200 with files. The host device 100 may include a plurality of file systems. The device driver 150 may send a read request and/or a write request to the data storage device 200 for handling the read or write operations. The first memory 160 may store data used by the host device 100.

The host device 100 may further include a disk information management module 110. The disk information management module 110 may manage disk information on one or more disks managed by the host device 100. Data structure of the disk information will be disclosed with reference to FIGS. 2 and 3.

The host device 100 may further include a file information management module 120. The file information management module 120 may manage file information on files managed by the host device 100. Data structure of the file information will be disclosed with reference to FIGS. 9 to 12.

The host device 100 may provide the disk information managed at the disk information management module 110 and/or the file information managed at the file information management module 120 to the data storage device 200.

The data storage device 200, for example, a solid-state drive (SSD), may include a second memory (or an information memory) 210, a controller 220, and a third memory (or a storage memory).

The second memory 210 may store the disk information and/or the file information provided from the host device 100. The controller 220 may control to process the requests on the second memory 210 received from the host device 100, based on the disk information and/or the file information stored in the second memory 210.

The third memory 230 may store data requested by the host device 100 and include a volatile memory and/or a non-volatile memory. In the following disclosure, the third memory 230 is assumed to a flash memory device using a page-level mapping.

The second memory 210 may store the disk information and/or the file information corresponding to a physical address of the third memory 230, and the second memory 210 may be embodied with a volatile memory, for example, DRAM for a high-speed operation. Throughout the disclosure, the physical address may represent a physical block address of the third memory 230, for example, a flash memory.

The data stored in the second memory 210 may be backed up. The backup data may be stored in a backup memory 240, for example, a nonvolatile memory. If the third memory 230 is a non-volatile memory, a part of the third memory 230 may be used to back up the second memory 210. The backup data may be reloaded into the second memory 210 when the host device 100 reboots and/or when the data storage device 200 is reconnected with the host device 100.

FIG. 2 is a diagram illustrating a message format including the disk information provided by the host device 100 to the data storage device 200 shown in FIG. 1.

A message provided by the host device 100 may include a command CMD and the disk information. The disk information may include the number of regions, a starting logical address of respective region, and a last logical address of the respective region.

The command CMD may denote an operation to be performed by the data storage device 200 with the disk information. The data storage device 200 may newly store the disk information or may update the disk information stored therein based on the command CMD.

The number of regions may represent a number of regions being distinguished each other. In an embodiment, the regions may be distinguished in accordance with kind of disk partition, (e.g., swap partition, file system partition), name of the file system, kind of data managed by the file system (e.g., meta data, normal data). In other embodiments, the regions may be distinguished according to other criteria.

Each region may be identified with a corresponding region number. Each region may be related with the logical addresses that do not overlap the logical addresses related with other regions. Throughout the disclosure, the logical address may represent a logical block address. In the embodiment, it is assumed that the number of regions is two and the region numbers for the regions are I and J, respectively.

Figure 3:
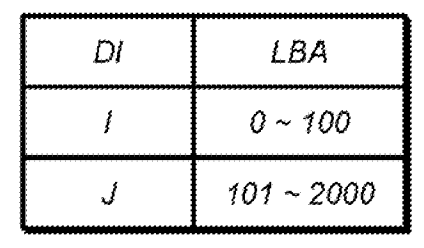

FIG. 3 illustrates an example of the disk information managed by the host device shown in FIG. 1.

The disk information may include a region number DI, and a logical address LBA corresponding to the region number DI. In the embodiment, logical addresses 0 to 100 may correspond to region number I and the logical addresses 101 to 2000 may correspond to region number J.

The host device 100 may transmit the disk information including both the region number and the corresponding logical addresses as shown in FIG. 2. If the relation between the region number and the corresponding logical addresses is predetermined, the region information may not be transmitted to the data storage device 200.

Figure 4:
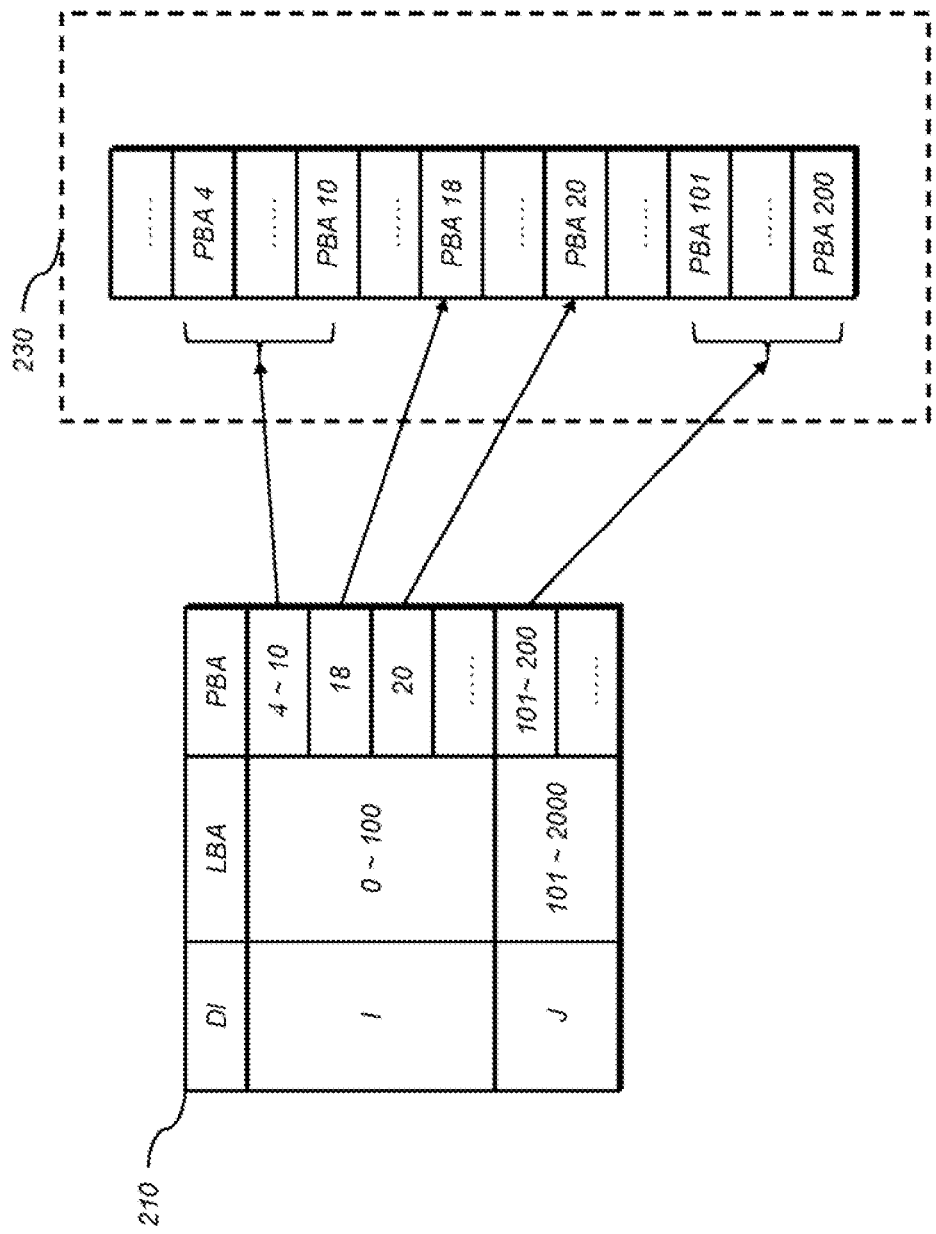
FIG. 4 illustrates an example of disk information and a physical address stored in a data storage device in accordance with an embodiment of the present invention.

FIG. 4 illustrates an example of disk information and a physical address stored in the data storage device 200 shown in FIG. 1.

The disk information including the region number and the corresponding logical address may be stored in the second memory within the data storage device 200. The second memory 210 may further store the physical addresses corresponding to the disk information.

The disk information stored in the second memory 210 may include the region number and the logical address. As aforementioned, if a region may be identified only with the logical address, the region number may not be stored in the second memory 210.

Figure 8:
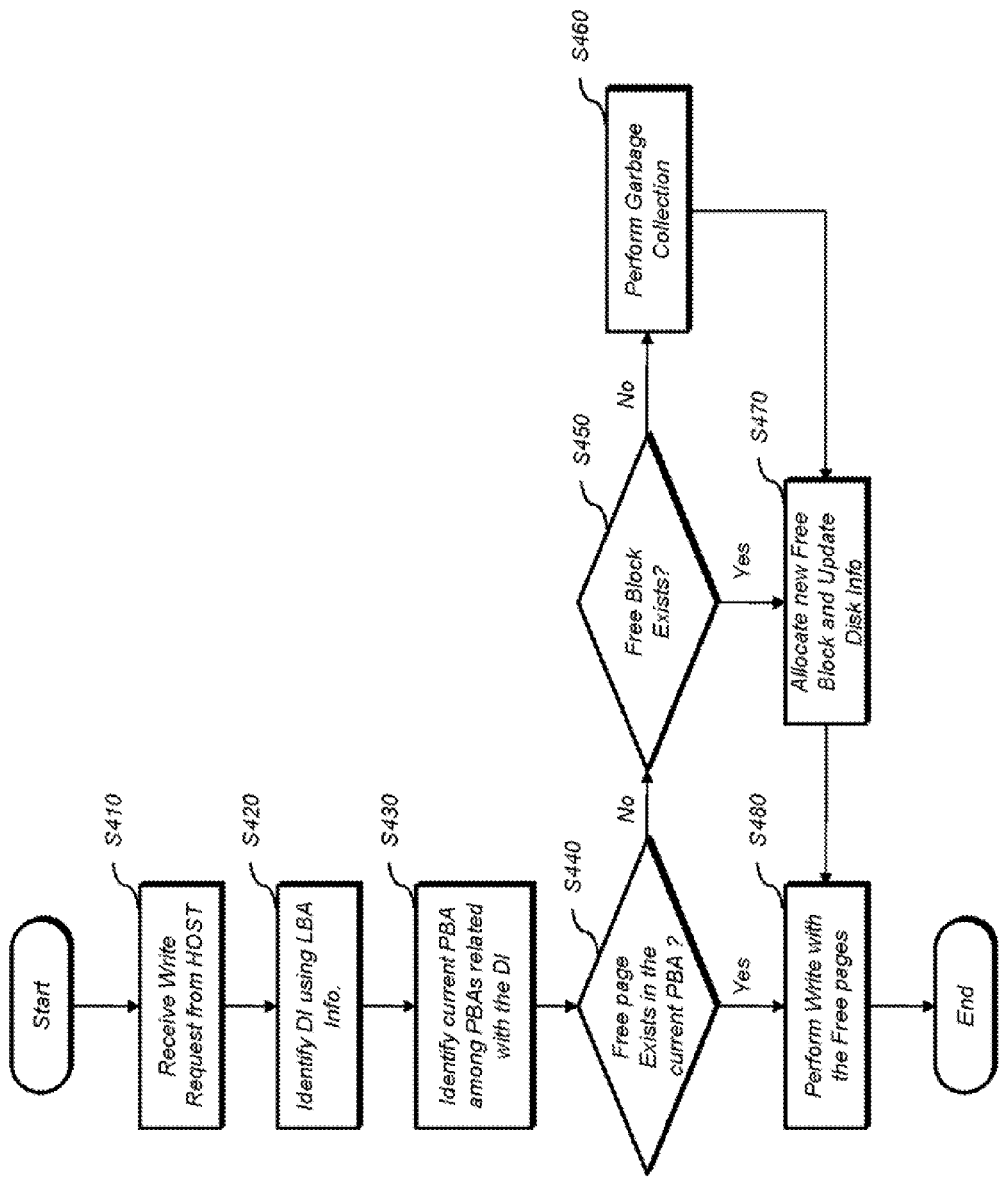
FIG. 8 is a flow chart illustrating an operation of a data storage device in accordance with an embodiment of the present invention.

Determining relationship between the disk information and the physical address will be disclosed in detail with reference to FIG. 8.

Figure 5:
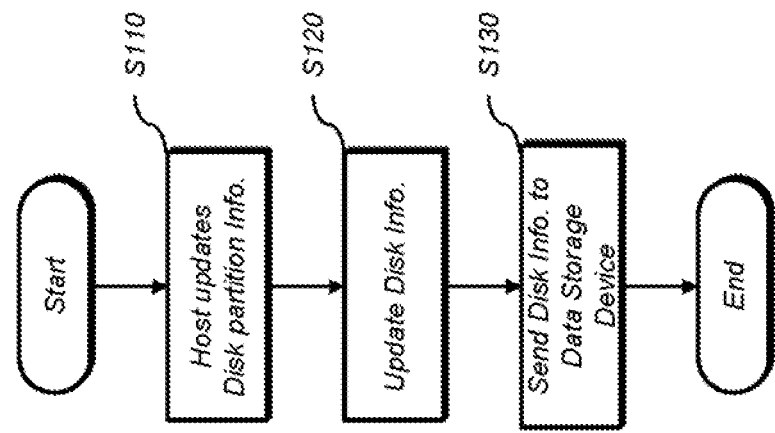
FIG. 5 is a flow chart illustrating an operation of a host device when disk information is updated in accordance with an embodiment of the present invention.

FIG. 5 is a flow chart illustrating an operation of the host device 100 when the disk information is updated in accordance with an embodiment of the present invention.

The host device 100 updates disk partition information at step S110.

The disk information management module 110 updates disk information to have data structure as shown in FIG. 3 at step S120. The disk partition information may be changed when an existing partition is divided and/or when existing partitions are merged. According to the change in disk partition information, a new region number may be generated or an existing region number may be deleted and relationship between a region number and logical addresses may change.

The host device 100 may transmit a message including the updated disk information as shown in FIG. 2 to the data storage device 200 at step S130.

After receiving the message, the controller 220 within the data storage device 200 may identify a command CMD and update the disk information as shown in FIG. 4.

When the partition information is updated, all data in the corresponding partition may be deleted. In this case, the controller 220 may reset physical addresses related to the updated region and may invalidate all corresponding pages in the third memory 230.

Figure 6:
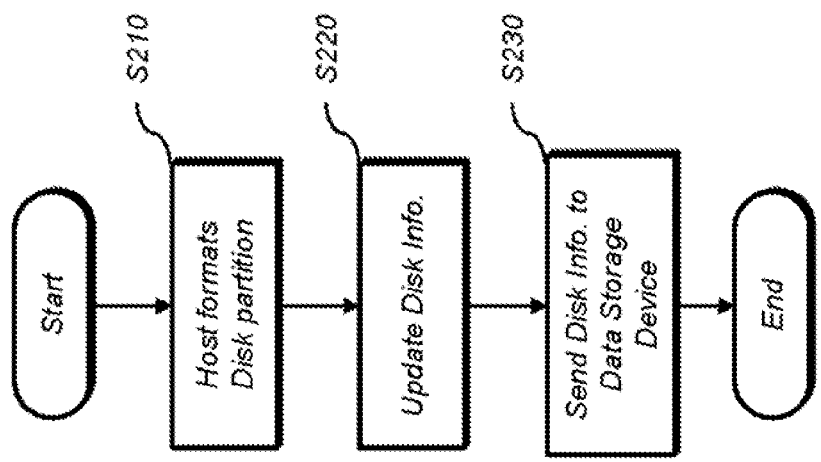
FIG. 6 is a flow chart illustrating an operation of a host device when disk partition is formatted in accordance with an embodiment of the present invention.

FIG. 6 is a flow chart illustrating an operation of the host device 100 when a disk partition is formatted in accordance with an embodiment of the present invention.

The host device 100 formats a disk partition at step S210.

The disk information management module 110 updates the disk information having data structure as shown in FIG. 3 at step S220.

The host device 100 may transmit a message including the updated disk information as shown in FIG. 2 to the data storage device 200 at step S230.

After receiving the message, the controller 220 within the data storage device 200 may identify a command CMD and update the disk information as shown in FIG. 4.

When a partition is formatted, all data in the corresponding partition may be deleted. In this case, the controller 220 may reset physical addresses related to the formatted region and may invalidate all corresponding pages in the third memory 230.

Figure 7:
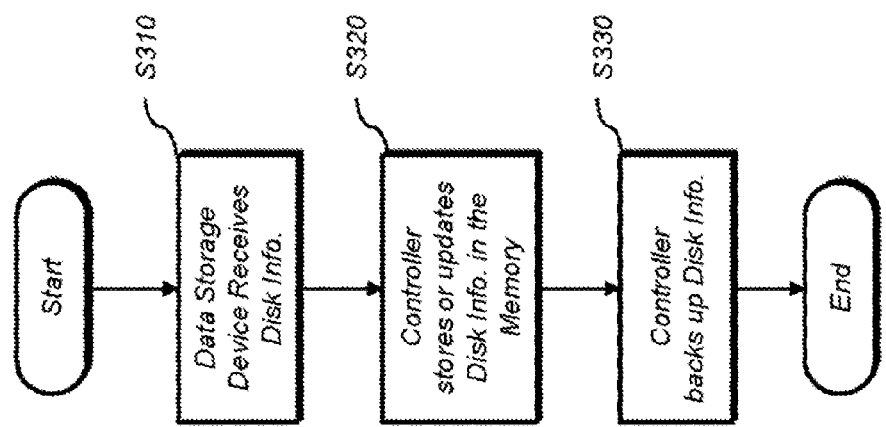
FIG. 7 is a flow chart illustrating an operation of a data storage device to store disk information provided from a host device in accordance with an embodiment of the present invention.

FIG. 7 is a flow chart illustrating an operation of the data storage device 200 to store disk information provided from the host device 100 in accordance with an embodiment of the present invention.

The data storage device 200 may receive a message including the disk information as shown in FIG. 2, at step S310.

The controller 220 may store new disk information or may update existing disk information according to the received message at step S320.

The controller 220 may back up the disk information at step S330. As aforementioned, the controller 220 may use the backup memory 240 or a part of the third memory 230.

The backup disk information may be used to reload the disk information when the host device 100 reboots and/or when the data storage device 200 is reconnected to the host device 100.

If necessary, the backup operation may be performed before when the disk information is updated, when power is turned off, and when the host device 100 and the data storage device 200 are disconnected.

FIG. 8 is a flow chart illustrating an operation of the data storage device 200 shown in FIG. 1.

The data storage device 200 receives a write request from the host device 100 at step S410.

The controller 220 may identify a region number corresponding to a requested logical address by referring to the second memory 210 at step S420.

The controller 220 may identify a current physical address corresponding to the identified region at step S430. The current physical address may represent a physical address most recently used among physical addresses corresponding to the identified region.

The controller 220 may check whether a free page exists in a block of the current physical address at step S440.

If a free page does not exist, the controller 220 may check whether a free block exists in the third memory 230, at step S450. If a free page exists, the controller 220 may process the write request at the free page in the free block at step S480.

If a free block exists, the controller 220 may allocate a new free block and updates the corresponding disk information at step 470.

If a free block does not exist, at step S460, the controller 220 may perform a garbage collection to make a free block and then may sequentially perform the steps S470 and S460.

The free block may have a physical address, which is not related to any logical address. The controller 220 may update the second memory 210 by relating the free block with a requested logical address.

By processing the write request as shown in FIG. 8, each block of the third memory 230 may include a plurality of page data corresponding to the same region. For example, two data each in a different region such as different partition or different file system may not be stored in the same block.

This may induce invalid pages to be confined in specific blocks, thereby reducing the number of garbage collection operations and the cost of each garbage collection operation.

In the following, an embodiment where the host device 100 transmits file information to the data storage device 200 is disclosed.

Figure 9:
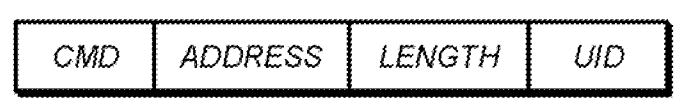
Figure 10:
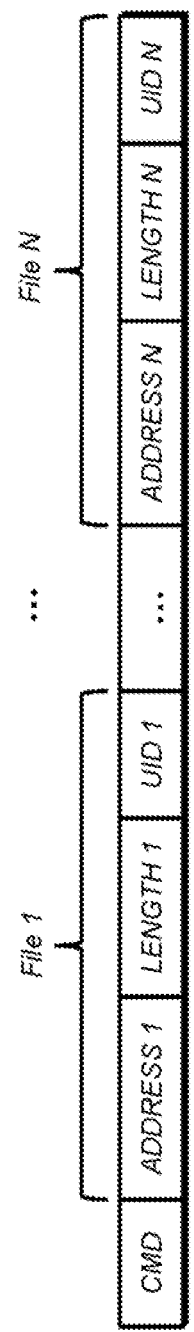

FIGS. 9 and 10 are diagrams illustrating a message format including file information provided by the host device 100 to the data storage device 200 shown in FIG. 1.

The message shown in FIG. 9 corresponds to a message including file information for one file, and the message shown in FIG. 10 corresponds to a message including file information for a plurality of files.

The message provided by the host device 100 may include a command CMD and file information. The file information may include an address, a length, and a file identification number UID of a corresponding file.

The command CMD denotes an operation performed by the data storage device 200 with the file information. The data storage device 200 may newly store the file information or may update the file information stored therein based on a command CMD.

The address denotes starting address of a corresponding file, and the length denotes a length of the corresponding file.

The file identification number UID denotes an identification number used by the host device 100 to identify the corresponding file and may be managed by the file information management module 120.

FIG. 11 illustrates an example of file identification number managed by the host device 100 shown in FIG. 1.

The file information may include a file identification number UID. If the host device 100 includes a plurality of file systems, each of the file systems may be related to a unique number, such as A and B, and each file in a file system may be related to a unique number such as 1233 and 1432.

The file identification number UID may be generated by combining a unique number for a corresponding file system and a unique number for a corresponding file in the file system. The format of the file identification number UID or method for generating the file identification number UID may change in accordance with embodiments.

Figure 12:
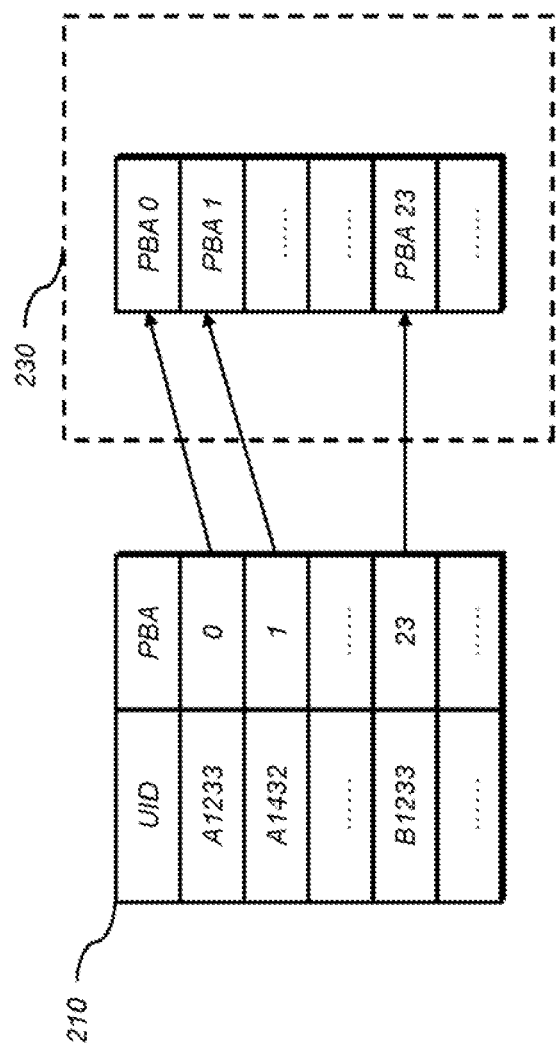
FIG. 12 illustrates an example of file information and a physical address stored in a data storage device in accordance with an embodiment of the present invention.

FIG. 12 illustrates an example of file information and a physical address stored in the data storage device 200 shown in FIG. 1.

The file information and the related physical address may be stored in the second memory 210. The file information may include a file identification number UID. Each file identification number UID corresponds to a physical address. When a plurality of blocks are required to store a file, a last physical address used for the file is related to a file identification number UID.

Figure 13:
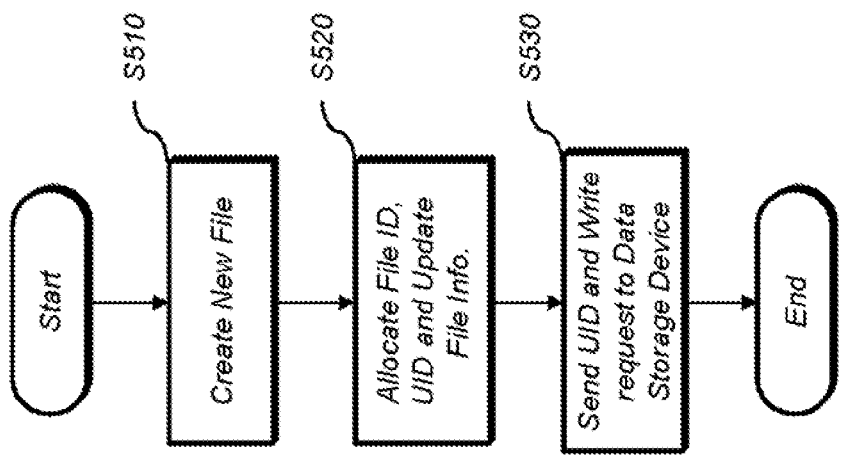
FIG. 13 is a flow chart illustrating an operation of a host device when a file is created in accordance with an embodiment of the present invention.

FIG. 13 is a flow chart illustrating an operation of the host device 100 when a file is created in accordance with an embodiment of the present invention.

The host device 100 may create a new file at step S510.

The file information management module 120 may allocate a unique file number in a file system, may generate a file identification number UID as aforementioned, and may update file information as shown in FIG. 11 at step S520.

The host device 100 may transmit a write request with a file identification number UID to the data storage device 200 at step S530.

Figure 14:
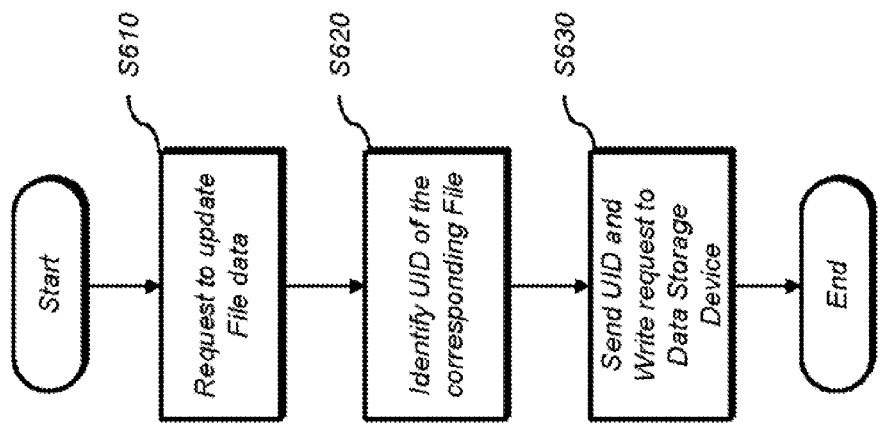
FIG. 14 is a flow chart illustrating an operation of a host device when a file is modified in accordance with an embodiment of the present invention.

FIG. 14 is a flow chart illustrating an operation of the host device 100 where a file is modified in accordance with an embodiment of the present invention.

A request for file update is generated by the host device 100 at a step S610.

The host device 100 may check a file identification number UID corresponding to the file at step S620.

The host device 100 may transmit a write request with a file identification number UID to the data storage device 200 at step S630.

If the third memory 230 is a flash memory, an overwrite operation may be impossible therefore a new write request is performed.

Figure 15:
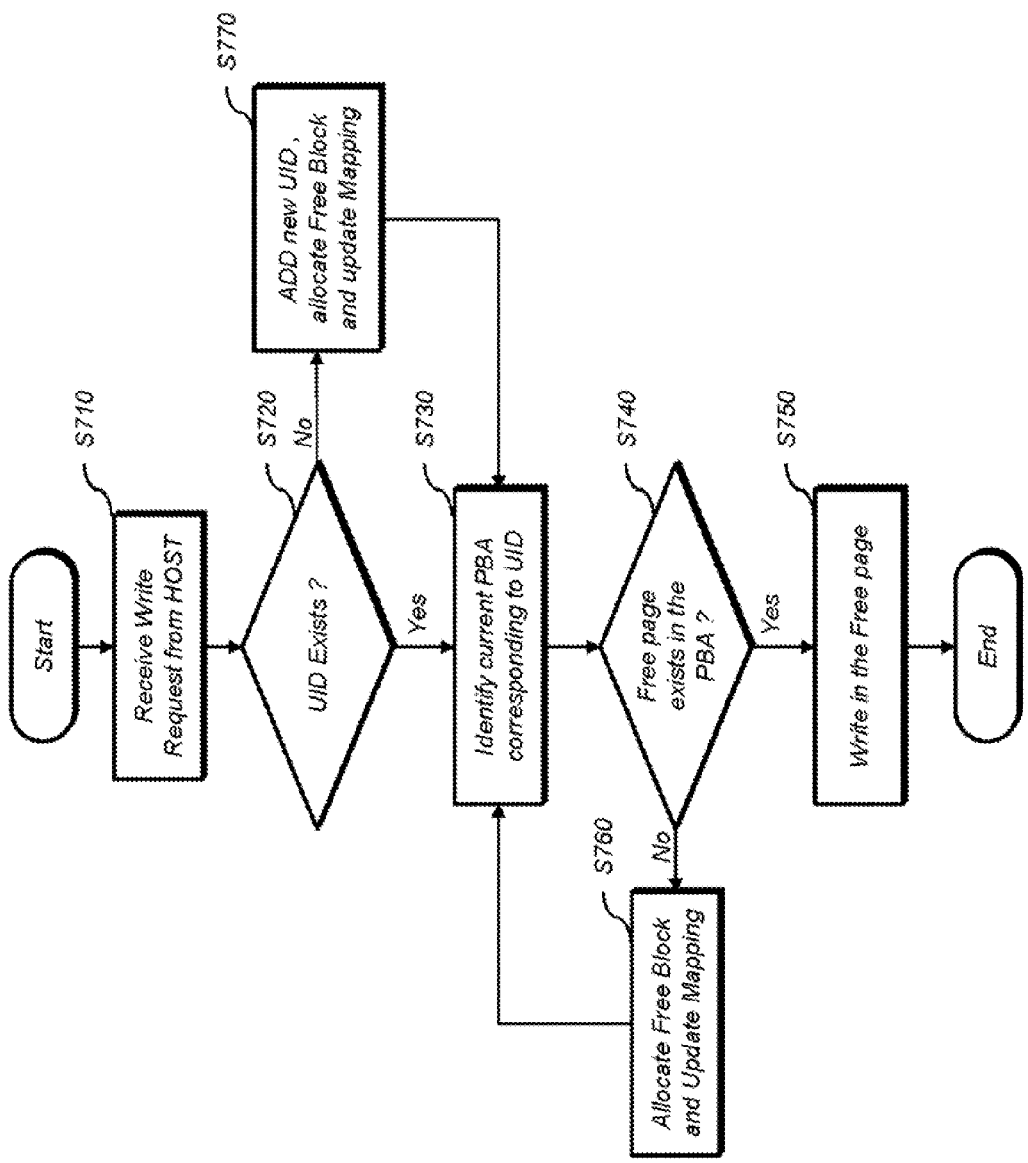
FIG. 15 is a flow chart illustrating an operation of a data storage device for handling a write request from a host device in accordance with an embodiment of the present invention.

FIG. 15 is a flow chart illustrating an operation of the data storage device 200 for handling a write request from the host device shown in FIG. 1.

The data storage device 200 may receive a write request with a file identification number UID from the host device 100, at step S710.

The controller 220 may check whether the received file identification number UID exists in the second memory 210, at step S720.

If the transmitted file identification number UID exists in the second memory 210, the controller 220 may find out a physical address corresponding to the file identification number UID with reference to the second memory 210 at step S730.

At step S770, if the transmitted file identification number UID does not exist in the second memory 210, the controller 220 stores the transmitted file identification number UID in the second memory 210 and relates a blank physical address to the transmitted file identification number UID. Then, the controller 220 performs the step S730.

The controller 220 may check whether a free page exists in the physical address at step S740.

If any free page does not exist in the physical address, the controller 220 may allocate a new free block and may update a second memory 220 to have physical address of the newly allocated block corresponding to the file identification number UID at step S760.

The controller 220 may write a data in the free page at step S750.

If a write request is processed as disclosed in FIG. 15, each block of the third memory 230 may include a data corresponding to the same file. This may induce invalid pages to be confined in specific blocks, thereby reducing the number of garbage collection operations and the cost of each garbage collection operation.

Figure 16:
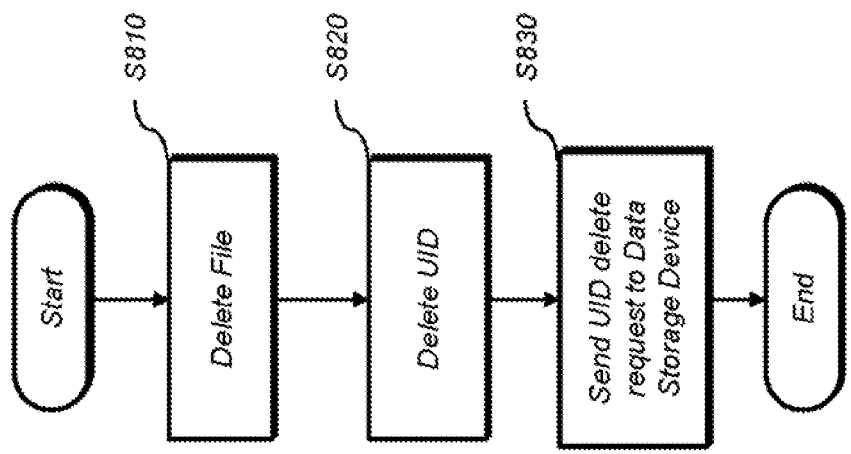
FIG. 16 is a flow chart illustrating an operation of a host device when a file is deleted in accordance with an embodiment of the present invention.

FIG. 16 is a flow chart illustrating an operation of the host device 100 when a file is deleted in accordance with an embodiment of the present invention.

The host device 100 deletes a file at step S810.

The file information management module 120 may delete file information including a file identification number UID corresponding to the deleted file at step S820.

The host device 100 may transmit a request to delete the file information to the data storage device 200 at step S830.

Figure 17:
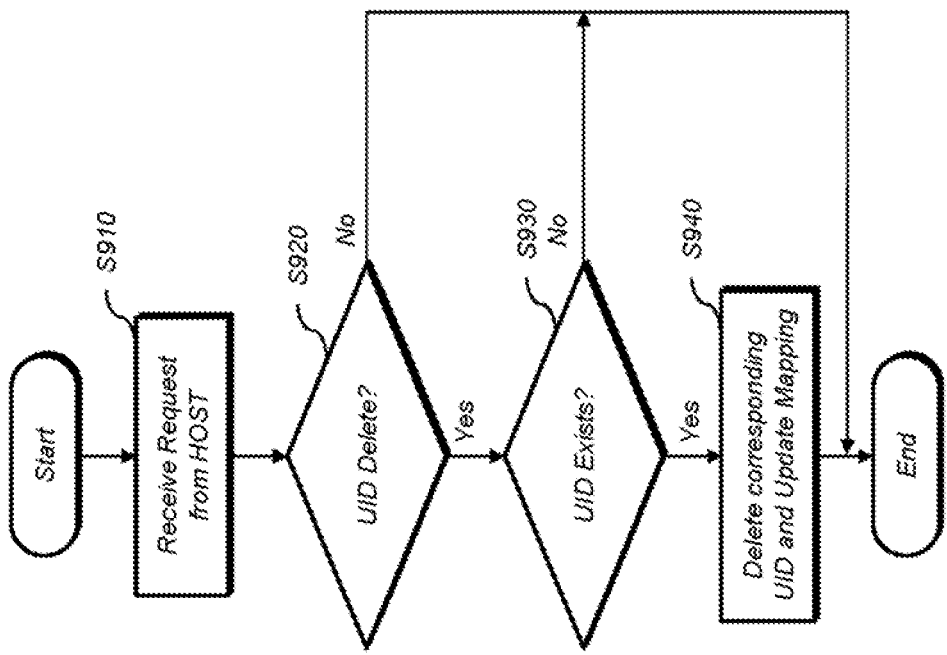
FIG. 17 is a flow chart illustrating an operation of a data storage device for handling a file delete request from a host device in accordance with an embodiment of the present invention.

FIG. 17 is a flow chart illustrating an operation of the data storage device 200 for handling a file information delete request from a host device in accordance with an embodiment of the present invention.

The data storage device 200 may receive a request from the host device 100 at step S910.

The controller 220 may check whether the received request is for deleting file information at step S920.

If the request is not for deleting file information, the operation is terminated.

If the request is for deleting file information, the controller 220 may check whether a requested file identification number UID exists in the second memory 210 at step S930. If the corresponding file identification number UID does not exist, the operation is terminated.

The controller 220 may delete the requested file identification number UID from the second memory 210, thereby a mapping relation between the file identification number UID and physical addresses are deleted at step S940

The host device 100 may transmit logical addresses of deleted files with a TRIM command to make the corresponding pages to be invalidated. Since a block is filled with data corresponding to a file, the pages invalidated by the TRIM command may be confined in specific blocks and the cost for a garbage collection operation may be reduced.

Though the present invention is disclosed with reference to specific embodiments, the scope of the present invention is not limited thereto. The present invention may include any embodiments where a host device provides disk information and/or file information to a data storage device to process a request in its scope.

Although various embodiments have been described for illustrative purposes, it will be apparent to those skilled in the art that various changes and modifications may be made without departing from the spirit and scope of the invention as defined in the following claims.

What is claimed is:

1. A data storage device comprising:
    a semiconductor storage memory including a plurality of physical blocks each including a plurality of physical pages;
    an information memory configured to store mapping relation between disk information and/or file information transmitted from a host device and physical block addresses of the plurality of physical blocks; and
    a controller configured to process a write request, which is received from the host device, on one or more physical blocks each having a physical block address related to information on disk and/or file included in the write request with reference to the mapping relation stored in the information memory, wherein the one or more physical blocks do not include a physical page having a data unrelated to the information on disk and/or file included in the write request, and wherein when a host request is received to delete a file and/or a disk related to the information on disk and/or file included in the write request, the controller invalidates some or all physical pages each included in the one or more physical blocks and the controller deletes a mapping relation corresponding to the information on disk and/or file included in the write request from the information memory and the one or more physical blocks do not include a valid physical page having a data unrelated to the information on disk and/or file included in the write request thereafter.

2. The data storage device of claim 1, wherein the disk information includes logical address corresponding to a region managed by the host device, and the file information includes file identification number managed by the host device.

3. The data storage device of claim 1, wherein the controller finds out the physical block address for the semiconductor storage memory corresponding to the information on disk and/or file and processes the write request on the physical block address.

4. The data storage device of claim 3, wherein the controller inserts the information on disk and/or file in the write request into the information memory and relates the inserted information with a new physical block address of the semiconductor storage memory if the information on disk and/or file in the write request is not in the information memory.

5. A system comprising:
a data storage device; and
a host device providing disk information and/or file information to the data storage device,
wherein the data storage device comprises:
a semiconductor storage memory including a plurality of physical blocks each including a plurality of physical pages;
an information memory configured to store mapping relation between the disk information and/or the file information transmitted from the host device and physical block addresses of the plurality of physical blocks; and
a controller configured to process a write request, which is received from the host device, on one or more physical blocks each having a physical block address related to information on disk and/or file included in the write request with reference to the mapping relation stored in the information memory,
wherein the one or more physical blocks do not include a physical page having a data unrelated to the information on disk and/or file included in the write request, and
wherein when a host request is received to delete a file and/or a disk related to the information on disk and/or file included in the write request, the controller invalidates some or all physical pages each included in the one or more physical blocks and the controller deletes a mapping relation corresponding to the information on disk and/or file included in the write request from the information memory and the one or more physical blocks do not include a valid physical page having a data unrelated to the information on disk and/or file included in the write request thereafter.

6. The system of claim 5, wherein the host device comprises an information management module for managing the disk information and/or the file information.

7. The system of claim 6, wherein the information management module includes a disk information management module suitable for managing the disk information and a file information management module suitable for managing the file information.

8. The system of claim 5, wherein the disk information includes a logical address corresponding to a region managed by the host device, and the file information includes file identification number managed by the host device.

9. The system of claim 5, wherein the controller finds out the physical block address for the semiconductor storage memory corresponding to the information on disk and/or file and processes the write request on the physical block address.

10. The system of claim 9, wherein the controller inserts the information on disk and/or file in the write request into the information memory and relates the inserted information with a new physical block address of the semiconductor storage memory, if the information on disk and/or file in the write request is not in the information memory.

11. An operating method of a system with a host device and a data storage device comprising a semiconductor storage memory including a plurality of physical blocks each including a plurality of physical pages and an information memory configured to store a mapping relation between disk information and/or file information and physical block addresses of the plurality of physical blocks, the operating method comprising:
receiving, by the data storage device, a write request and information on disk and/or file corresponding to the write request from the host device;
identifying, by the data storage device, a first physical block address corresponding to the information on disk and/or file with reference to the mapping relation stored in the information memory;
processing, by the data storage device, the write request on a physical block having the first physical block address if the first physical block address is identified,
wherein the physical block having the first physical block address does not include a physical page having a data unrelated to the information on disk and/or file corresponding to the write request;
receiving, by the data storage device, a delete request on a file and/or a disk having the information on disk and/or file corresponding to the write request from the host device;
invalidating, by the data storage device, some or all physical pages in the physical block having the first physical block address corresponding to the information on disk and/or file, wherein the physical block having the first physical block address does not include a valid physical page having a data unrelated to the information on disk and/or file corresponding to the write request thereafter; and
deleting, by the data storage device, a mapping relation corresponding to the information on disk and/or file included in the write request from the information memory.

12. The operating method of claim 11, further comprising:
relating, by the data storage device, a second physical block address of the semiconductor storage memory with the information on disk and/or file if the first physical block address is not identified; and processing, by the data storage device, the write request on the second physical block address.

13. The operating method of claim 11, wherein the disk information includes a logical address corresponding to a region managed by the host device, and the file information includes file identification number managed by the host device.

14. The operating method of claim 11, further comprising:

updating, by host device, the disk information and/or the file information; and transmitting, by host device, the updated disk information and/or the updated file information to the data storage device.

15. The operating method of claim 14, wherein the disk information includes a logical address corresponding to a region managed by the host device, and the file information includes file identification number managed by the host device.

* * * * *